United States Patent
Okabe et al.

(10) Patent No.: US 10,613,368 B2
(45) Date of Patent: Apr. 7, 2020

(54) BUFFER SHEET AND FLAT PANEL DISPLAY

(71) Applicant: KEIWA INC., Tokyo (JP)

(72) Inventors: Motohiko Okabe, Tokyo (JP); Hirohisa Dejima, Tokyo (JP)

(73) Assignee: Keiwa Inc., Tokyo (JP)

(*) Notice: Subject to any disclaimer, the term of this patent is extended or adjusted under 35 U.S.C. 154(b) by 0 days.

(21) Appl. No.: 16/100,526

(22) Filed: Aug. 10, 2018

(65) Prior Publication Data

US 2019/0049790 A1 Feb. 14, 2019

(30) Foreign Application Priority Data

Aug. 10, 2017 (JP) .................. 2017-154992
Jul. 27, 2018 (JP) .................. 2018-141834

(51) Int. Cl.
*G02F 1/1335* (2006.01)
*F21V 8/00* (2006.01)
*G02F 1/1333* (2006.01)

(52) U.S. Cl.
CPC ..... *G02F 1/133504* (2013.01); *G02B 6/0036* (2013.01); *G02B 6/0053* (2013.01); *G02F 1/133308* (2013.01); *G02B 6/0051* (2013.01); *G02F 2001/133317* (2013.01); *G02F 2001/133607* (2013.01); *G02F 2201/503* (2013.01)

(58) Field of Classification Search
None
See application file for complete search history.

(56) References Cited

FOREIGN PATENT DOCUMENTS

JP 2000-075134 3/2000
JP 2011-128607 6/2011

OTHER PUBLICATIONS

Translation of JP2011128607 (Year: 2019).*

* cited by examiner

*Primary Examiner* — Phu Vu
(74) *Attorney, Agent, or Firm* — Norris McLaughlin, P.A.

(57) ABSTRACT

A buffer sheet is provided capable of sufficiently inhibiting scratches on the prism sheet upon an impact applied by falling, etc. The buffer sheet is for use in a flat panel display including a prism sheet having prisms on a surface thereof and a display element disposed to face the prisms, wherein the buffer sheet is to be disposed between the prism sheet and the display element, and an average microindentation hardness of the buffer sheet is no greater than 250 N/mm$^2$. The buffer sheet preferably has projections on a face on a side to face the prism sheet. The average microindentation hardness is preferably measured at the projections. The buffer sheet preferably includes a buffer layer to face the prism sheet, the buffer layer preferably containing a resin matrix and resin beads dispersed in the resin matrix. A haze value of the buffer sheet is preferably 20%-95%.

6 Claims, 8 Drawing Sheets

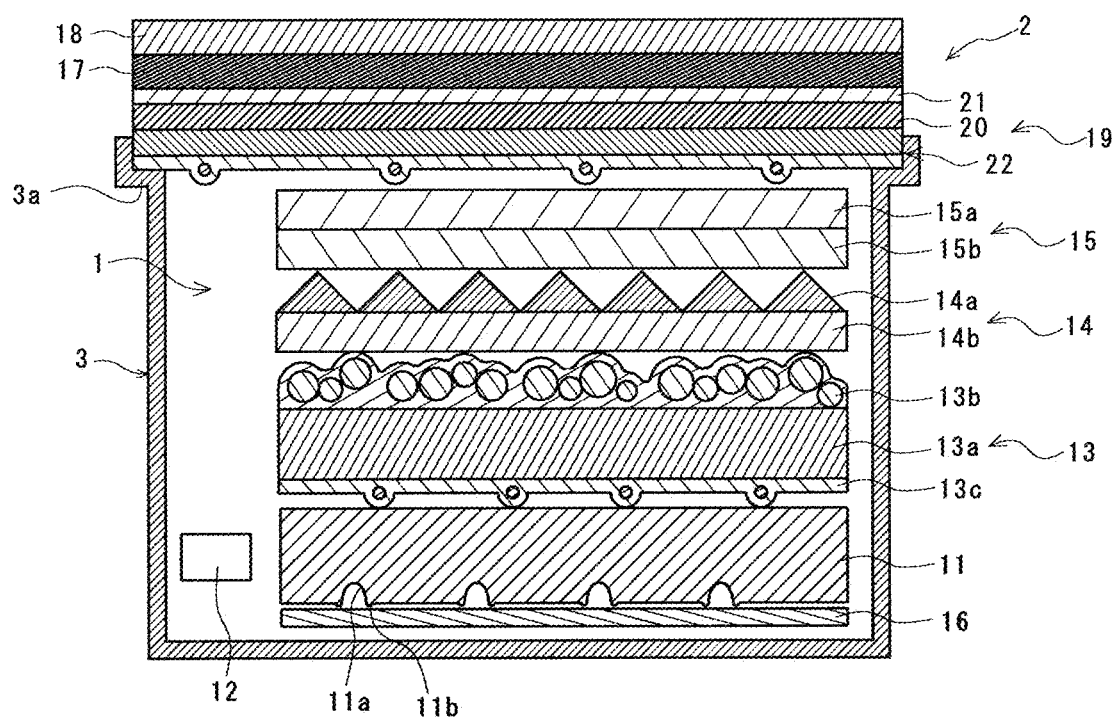
F I G. 1

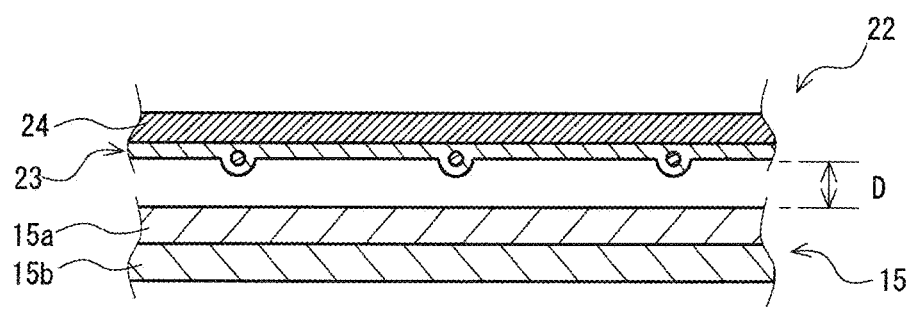
F I G. 4

BUFFER SHEET AND FLAT PANEL DISPLAY

BACKGROUND OF THE INVENTION

Field of Invention

The present invention relates to a buffer sheet and a flat panel display.

Description of the Related Art

Flat panel displays such as liquid crystal display devices have been widely used for comparatively large-sized screens such as those of televisions and personal computers, and for comparatively small-sized screens such as those of smartphones and tablet terminals, and the like, due to characteristic features such as thinness, lightweight properties, low electric power consumption, etc.

The flat panel display includes, for example: a liquid crystal display panel provided with a liquid crystal cell and a pair of polarizing plates overlaid on both sides of the liquid crystal cell; and a backlight unit that is disposed on a back face side of the liquid crystal display panel and emits rays of light toward the liquid crystal display panel (see Japanese Unexamined Patent Application, Publication No. 2000-75134).

As the backlight unit, there are edge-lit (side-lit) backlight units, direct-lit backlight units, and the like. For example, the edge-lit backlight unit includes, as illustrated in FIG. 8: an optical waveguide plate 101 that guides rays of light entering from an end face toward a front face side; one or a plurality of LED light source(s) 102 arranged along the end face of the optical waveguide plate 101; a light diffusion sheet 103 that is overlaid on the front face side of the optical waveguide plate 101; and a prism sheet 104 that is overlaid on the front face side of the light diffusion sheet 103 (see Japanese Unexamined Patent Application, Publication No. 2011-128607).

PRIOR ART DOCUMENTS

Patent Documents

Patent Document 1: Japanese Unexamined Patent Application, Publication No. 2000-75134
Patent Document 2: Japanese Unexamined Patent Application, Publication No. 2011-128607

SUMMARY OF THE INVENTION

Problems to be Solved by the Invention

Flat panel displays for comparatively small-sized screens such as those of smartphones, tablet terminals, and the like are often used in a state of being carried by a user or held in the user's hand. Such flat panel displays are therefore highly liable to undergo an impact from the outside due to falling during carrying, use, or the like.

Consequently, in the conventional flat panel displays, a prism array constituted of a plurality of prisms on a prism sheet is highly susceptible to scratches upon application of an impact from the outside, due to bumping against a member disposed on the front face side of the prism sheet. As a result, a displayed image is likely to lack uniformity of the luminance owing to the scratches on the prism array.

The present invention was made in view of the foregoing circumstances, and an object of the present invention is to provide a buffer sheet capable of sufficiently inhibiting the scratches on the prism sheet upon an impact applied by falling, etc., and a flat panel display including the buffer sheet.

Means for Solving the Problems

According to an aspect of the present invention made for solving the aforementioned problems, a buffer sheet for use in a flat panel display comprises a prism sheet having a plurality of prisms on a surface thereof and a display element disposed to face the plurality of prisms, and is to be disposed between the prism sheet and the display element, and an average microindentation hardness of the buffer sheet is no greater than 250 N/mm$^2$.

Due to being disposed to face the plurality of prisms on the prism sheet and having the average microindentation hardness no greater than the upper limit, the buffer sheet of the aspect is capable of sufficiently inhibiting scratches on the plurality of prisms in the case of falling and the like of the flat panel display including the buffer sheet. More specifically, a buffer sheet is provided which has reduced scratches even after conducting a severe test method called the ball-drop test (described later).

It is preferred that the buffer sheet has a plurality of projections on a face on a side to face the prism sheet. Due to having the plurality of projections on the face on the side to face the prism sheet, the plurality of prisms are likely to be in scattered contact with the plurality of projections, and consequently more reliable inhibition of scratches of the plurality of prisms is enabled. In addition, due to the scattered contact of the plurality of prisms with the plurality of projections, adhesion between the buffer sheet and a ridge line of the plurality of prisms is inhibited, and consequently inhibition of light leaking, bright lines, and lack in uniformity of the luminance caused by the adhesion is enabled.

It is preferred that the average microindentation hardness is measured at the plurality of projections. When the average microindentation hardness measured at the plurality of projections, with which the plurality of prisms are likely to be in scattered contact, is no greater than the upper limit, easy and reliable inhibition of scratches on the plurality of prisms is enabled.

It is preferred that the buffer sheet includes a buffer layer to face the prism sheet and that the buffer layer contains a resin matrix and resin beads dispersed in the resin matrix. Due to the buffer sheet including the buffer layer to face the prism sheet, and the buffer layer containing the resin matrix and the resin beads dispersed in the resin matrix, easy and reliable inhibition of scratches on the plurality of prisms, and lack in uniformity of the luminance caused by interference with the pixel pitch of a display element and the like is enabled.

It is preferred that a haze value of the buffer sheet is no less than 20% and no greater than 95%. Due to the haze value of the buffer sheet falling within the above range, an increase in face luminance of the flat panel display is enabled while a moire pattern of the prisms themselves, lack in uniformity of the luminance caused by interference between the prisms and other members, and lack in uniformity of color (moire) are inhibited.

It is preferred that a surface resistance value of the face on the side to face the prism sheet is no greater than $10 \times 10^{15} \Omega/\square$. Due to the surface resistance value of the face on the side to face the prism sheet being no greater than the upper limit, inhibition of impairment of buffer capacity of the buffer sheet caused by a foreign substance attached to the face on the side to face the prism sheet is enabled.

It is preferred that the display element is a liquid crystal cell for a liquid crystal display device, and the buffer sheet is a polarizer protection sheet to be overlaid on a polarizer disposed on a face on an opposite side to a display face of the liquid crystal cell. Due to the buffer sheet being a polarizer protection sheet to be overlaid on a polarizer disposed on a face on an opposite side to a display face of the liquid crystal cell, promotion of a reduction in thickness is enabled owing to a reduction in the number of required parts.

According to another aspect of the present invention made for solving the aforementioned problems, a flat panel display includes: a prism sheet having a plurality of prisms on a surface thereof; a display element disposed to face the plurality of prisms; and the buffer sheet of the above aspect disposed between the prism sheet and the display element.

In the flat panel display, due to the buffer sheet of the above aspect being disposed between the prism sheet and the display element, sufficient inhibition of scratches on the plurality of prisms is enabled in the case of the plurality of prisms bumping against the buffer sheet.

It is to be noted that the term "microindentation hardness" as referred to means a value ($F_{max}$/Ap(hc)) calculated by dividing a maximum load ($F_{max}$) by a contact projected area (Ap(hc)) of an indenter at a contact indentation depth (hc), wherein the maximum load ($F_{max}$) is obtained by: indenting with the indenter (a Berkovich diamond indenter) with the maximum load of 5 mN and at a load velocity of 0.5 mN/sec; maintaining the indented state for 1 sec; and then unloading the indenter at the same velocity. The term "average microindentation hardness" as referred to means an average of values of the microindentation hardness obtained at arbitrary 10 points, excluding the greatest and second greatest values, as well as the smallest and second smallest values. The term "haze value" as referred to means a value measured pursuant to JIS-K7136:2000. The term "surface resistance value" as referred to means a value measured pursuant to JIS-K6911:2006.

Effects of the Invention

As explained in the foregoing, the buffer sheet and the flat panel display of the aspects of the present invention are capable of sufficiently inhibiting scratches on the prism sheet caused by an impact upon falling and the like.

BRIEF DESCRIPTION OF THE DRAWINGS

FIG. 1 is a schematic lateral end view of a flat panel display according to an embodiment of the present invention;

FIG. 4 is a schematic lateral end view showing a positional relationship between the buffer sheet and a prism sheet provided in the flat panel display illustrated in FIG. 1;

DESCRIPTION OF EMBODIMENTS

Hereinafter, preferred modes for carrying out the invention will be explained in more detail with references to the drawings, if necessary.

First Embodiment

Flat Panel Display

The flat panel display illustrated in FIG. 1 is configured as a liquid crystal display device. The flat panel display of the present embodiment is configured as a portable terminal having a comparatively small-sized screen such as a smartphone, a tablet terminal or the like, and is preferably configured as a touchscreen portable terminal from the perspective that a reduction in size of the entire terminal is enabled. The flat panel display includes an edge-lit backlight unit 1 (hereinafter, may be also merely referred to as "backlight unit 1"), a display panel 2 disposed on the front face side of the backlight unit 1, and a casing 3 that serves in positioning the display panel 1 with respect to the backlight unit 1. The casing 3 has a support portion 3*a* that abuts a face on the back face side (hereinafter, may be also merely referred to as "back face") of the display panel 2. Due to being supported by the support portion 3*a*, the display panel 2 is maintained spaced apart from the backlight unit 1. It is to be noted that the term "front face side" as referred to herein means a viewer's side, and the term "back face side" as referred to herein means the opposite side thereof.

Figure 2:
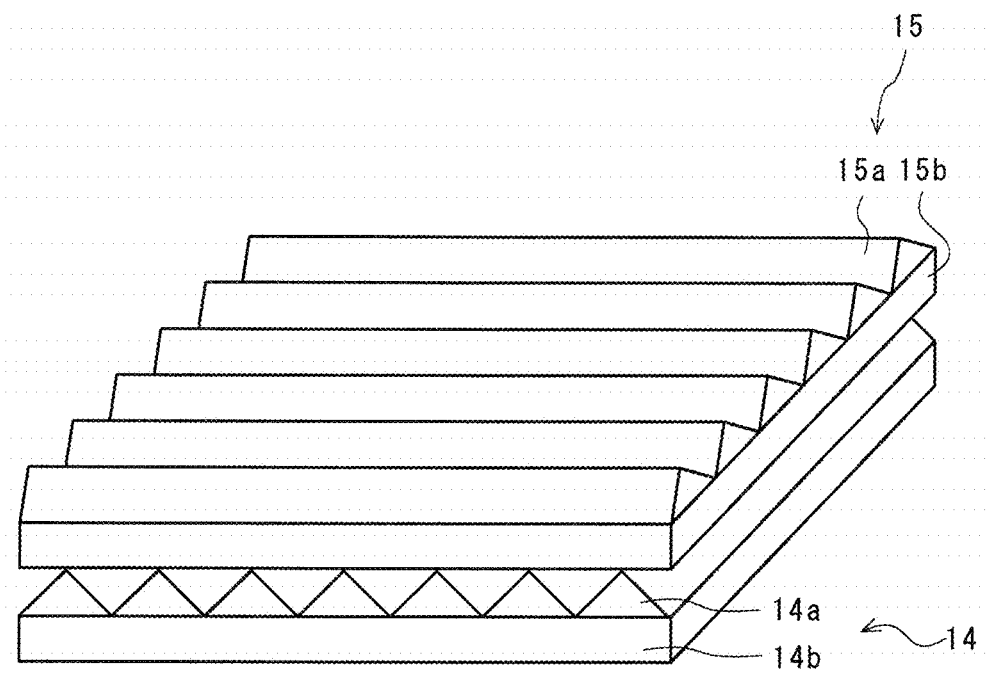
FIG. 2 is a schematic perspective view showing a positional relationship between a first prism sheet and a second prism sheet in the flat panel display illustrated in FIG. 1.

The backlight unit 1 is a backlight unit for a liquid crystal display device. The backlight unit 1 includes: an optical waveguide sheet 11 that guides rays of light entering from an end face toward a front face side; a light source 12 that irradiates rays of light toward the end face of the optical waveguide sheet 11; a light diffusion sheet 13 that is overlaid on the front face side of the optical waveguide sheet 11; a first prism sheet 14 that is overlaid on the front face side of the light diffusion sheet 13; and a second prism sheet 15 that is overlaid on the front face side of the first prism sheet 14. The backlight unit 1 further includes a reflection sheet 16 disposed on the back face side of the optical waveguide sheet 11. The optical waveguide sheet 11 allows the rays of light having entered from the end face to exit from a face on the viewer's side (hereinafter, may be also merely referred to as "front face") substantially uniformly. The light diffusion sheet 13 allows the rays of light entering from the back face side to diffuse and to be condensed in a normal direction (allowing the rays of light to be condensed and diffuse). The first prism sheet 14 and the second prism sheet 15 have a plurality of prisms 14*a* and 15*a*, respectively. The plurality of prisms 14*a* on the first prism sheet 14 and the plurality of prisms 15*a* on the second prism sheet 15 constitute prism arrays of which ridge lines are parallel. The first prism sheet 14 and the second prism sheet 15 each allow the rays of light entering from the back face side to be refracted in a normal direction. Specifically, a ridge line direction of the prism arrays on the first prism sheet 14 is substantially perpendicular to a ridge line direction of the prism arrays on the second prism sheet 15 as shown in FIG. 2. Thus, the rays of light emitted from the light diffusion sheet 13 are refracted by the prism arrays on the first prism sheet 14 in the normal direction, while the rays of light emitted from the first prism sheet 14 are refracted by the prism arrays on the second prism sheet 15 to travel substantially perpendicularly to the back face of the display panel 2. The reflection sheet 16 reflects the rays of light emitted from the back face of the optical waveguide sheet 11 toward the front face side.

The display panel 2 is a liquid crystal display panel. The display panel 2 includes: a display element 17; a first polarizing plate 18 that is overlaid on the front face side of the display element 17; and a second polarizing plate 19 that is overlaid on the back face side of the display element 17. In the flat panel display of the present embodiment, the display element 17 is a liquid crystal cell for a liquid crystal display device. Meanwhile, the second polarizing plate 19 includes: a polarizer 20; a front face side polarizer protection sheet 21 that is overlaid on the front face side of the polarizer 20; and a buffer sheet 22 according to another embodiment of the present invention that is overlaid on the back face side of the polarizer 20. In other words, the buffer sheet 22 is for use in the flat panel display including the prism sheet (second prism sheet 15) having the plurality of prisms 15a on a surface thereof and the display element disposed to face the plurality of prisms 15a on the second prism sheet 15, and is disposed between the second prism sheet 15 and the display element 17.

Buffer Sheet

The buffer sheet 22 is a polarizer protection sheet (back face side polarizer protection sheet) that is overlaid on a back face side of the polarizer 20 disposed on a face (back face) on an opposite side to a display face of the liquid crystal cell constituting the display element 17.

Figure 3:
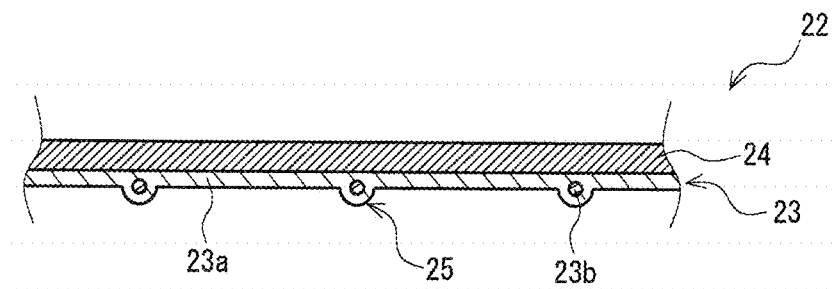
FIG. 3 is a schematic lateral end view of a buffer sheet provided in the flat panel display illustrated in FIG. 1.

As shown in FIG. 3, the buffer sheet 22 has a plurality of projections 25 on a face (back face) on a side facing the second prism sheet 15. The buffer sheet 22 includes a buffer layer 23 disposed to face the second prism sheet 15. The plurality of projections 25 protrude from the back face of the buffer layer 23. The buffer sheet 22 further includes a substrate layer 24 overlaid on the front face side of the buffer layer 23. In the buffer sheet 22, the buffer layer 23 and the substrate layer 24 are directly laminated to constitute a two-layered structure.

The lower limit of a planar area of the buffer sheet 22 is preferably 30 cm$^2$, more preferably 40 cm$^2$, and still more preferably 50 cm$^2$. Meanwhile, the upper limit of a planar area of the buffer sheet 22 is preferably 400 cm$^2$, more preferably 300 cm$^2$, and still more preferably 200 cm$^2$. When the planar area is smaller than the lower limit, a display screen may be so small that visibility of images may be insufficient. To the contrary, when the planar area is greater than the upper limit, the flat panel display may be so large in size that portability may be insufficient.

Buffer Layer

The buffer layer 23 is configured as a layer arranged on the back face of the buffer sheet 22. The buffer layer 23 contains a resin matrix 23a and resin beads dispersed in the resin matrix 23a. The buffer layer 23 contains the resin beads 23b in a dispersed manner with a substantially uniform density. The resin beads 23b are surrounded by the resin matrix 23a. The projections 25 formed on the back face of the buffer sheet 22 arise from the resin beads 23b. In other words, the projections 25 are formed in such a manner that the resin beads 23b protrude from a planar surface of the back face of the buffer layer 23, or that the resin matrix 23a that covers the back face side of the resin beads 23 protrudes from the planar surface of the back face of the buffer layer 23. As a result, the back face of the buffer layer 23 has such a shape that the plurality of projections 25 protrude scatteredly from the planar surface toward the back face side. The plurality of projections 25 each have a shape derived from the resin beads 23b, specifically a substantially hemispherical shape. The buffer layer 23 diffuses the rays of light externally, owing to the plurality of projections 25. Due to the buffer layer 23 containing the resin matrix 23a and the resin beads 23b dispersed in the resin matrix 23a, the buffer sheet 22 is capable of easily and reliably inhibiting lack in uniformity of the luminance caused by scratches on the plurality of prisms 15a on the second prism sheet 15, and lack in uniformity of the luminance caused by interference with the pixel pitch of the display element 17 and the like.

The lower limit of an average protrusion height of the plurality of projections 25 is preferably 1.0 µm, and more preferably 1.5 µm. Meanwhile, the upper limit of the average protrusion height is preferably 5.0 µm, and more preferably 4.5 µm. When the average protrusion height is smaller than the lower limit, in the case in which the flat panel display undergoes an unintended impact due to falling and the like, the plurality of prisms 15a on the second prism sheet 15 may be less likely to be in scattered contact with the plurality of projections 25. To the contrary, when the average protrusion height is greater than the upper limit, projections 25 that are comparatively large may be formed in a so large number that the light diffusion effect provided by the plurality of projections 25 may be enhanced, and consequently lack in uniformity of the luminance caused by interference with the pixel pitch of the display element 17 and the like may not be sufficiently inhibited. It is to be noted that the term "average protrusion height of the plurality of projections" as referred to means an average of heights of arbitrary ten projections.

The lower limit of an average thickness of the buffer layer 23 is not particularly limited, and preferably 2 µm and more preferably 3 µm. Meanwhile, the upper limit of the average thickness of the buffer layer 23 is not particularly limited, and preferably 20 µm, more preferably 10 µm, and still more preferably 8 µm. When the average thickness is smaller than the lower limit, buffering properties may be insufficient. To the contrary, when the average thickness is greater than the upper limit, it may be difficult to form the plurality of projections 25 having sufficient heights from the resin beads 23b on the back face of the buffer layer 23, and consequently, in the case in which the flat panel display undergoes an unintended impact due to falling and the like, the plurality of prisms 15a on the second prism sheet 15 may be less likely to be in scattered contact with the plurality of projections 25. It is to be noted that the term "average thickness of the buffer layer" as referred to means an average of a thickness of a portion with no projection 25 formed, between an average interface on the front face of the buffer layer and the planar surface on the back face of the buffer layer.

The average microindentation hardness of the buffer sheet 22 is no greater than 250 N/mm$^2$. The upper limit of the average microindentation hardness of the buffer sheet 22 is preferably 200 N/mm$^2$, more preferably 190 N/mm$^2$, still more preferably 150 N/mm$^2$, particularly preferably 100 N/mm$^2$, and most preferably 80 N/mm$^2$. When the average microindentation hardness is greater than the upper limit, in the case in which the flat panel display undergoes an unintended impact due to falling and the like, the plurality of prisms 15a on the second prism sheet 15 may be scratched. Meanwhile, the lower limit of the average microindentation hardness of the buffer sheet 22 is not particularly limited, and may be, for example, 10 N/mm$^2$.

As long as the average microindentation hardness of the buffer sheet 22 from the side to face the second prism sheet 15 falls within the above range, the projections 25 (for example, the resin beads 23b constituting the projections 25) and/or the resin matrix 23a may have the specific average microindentation hardness may have the specific average microindentation hardness. In other words, from a qualitative perspective, the buffer sheet 22 reduces scratches on the second prism sheet 15 (more specifically, the plurality of prisms 15a on the second prism sheet 15) due to the entire buffer sheet 22 or the buffer layer 23 formed to be soft. Therefore, any mode that produces the aforementioned scratch-reducing effect falls within the scope of the present invention.

It is preferred that the average microindentation hardness is measured at the plurality of projections 25. In this case, the microindentation hardness measured at a portion on the buffer sheet 22 other than the plurality of projections 25 may or may not fall within the above range since a main objective, to reduce scratches would be achieved by forming the projections 25 to be soft. When the average microindentation hardness measured at the plurality of projections 25, with which the plurality of prisms 15a on the second prism sheet 15 are likely to be in scattered contact, falls within the above range, easy and reliable inhibition of scratches on the plurality of prisms 15a is enabled.

Since the resin matrix 23a needs to transmit rays of light, the resin matrix 23a is formed from, for example, a transparent synthetic resin, preferably a colorless and transparent synthetic resin, as a principal component. The synthetic resin is exemplified by a thermosetting resin and an active energy ray-curable resin. It is to be noted that the term "principal component" as referred to means a component included at the greatest content, and for example, a component included at a content of no less than 50% by mass.

Examples of the thermosetting resin include an epoxy resin, a silicone resin, a phenol resin, a urea resin, unsaturated polyester, a melamine resin, an alkyd resin, an acrylic resin, an amide functional copolymer, polyurethane, and the like. Of these, an unsaturated polyester, an acrylic resin and polyurethane, which have high transparency and of which hardness is easily controllable through combination with a curing agent, are preferred as the thermosetting resin.

Examples of the active energy ray-curable resin include an ultraviolet ray-curable resin that is crosslinked and hardened upon irradiation with ultraviolet rays, an electron beam curable resin that is crosslinked and hardened upon irradiation with an electron beam, and the like. The active energy ray-curable resin can be appropriately selected from polymerizable monomers and polymerizable oligomers. In particular, as the active energy ray-curable resin, acrylic, urethane, or acrylic urethane ultraviolet ray-curable resins are preferred, in light of likelihood of improvement of adhesiveness with the substrate layer 24 and prevention of detachment of the resin beads 23b from the buffer layer 23.

As the polymerizable monomer, a (meth)acrylate monomer having a radical polymerizable unsaturated group in its molecule is suitably used, and in particular, a polyfunctional (meth)acrylate is preferred. The polyfunctional (meth)acrylate is not particularly limited as long as it is a (meth)acrylate having at least two ethylenic unsaturated bonds in its molecule. Specifically, ethylene glycol di(meth)acrylate, propylene glycol di(meth)acrylate, 1,4-butanediol di(meth)acrylate, 1,6-hexanediol di(meth)acrylate, neopentyl glycol di(meth)acrylate, polyethylene glycol di(meth)acrylate, hydroxypivalate neopentylglycol di(meth)acrylate, dicyclopentanyl di(meth)acrylate, caprolactone modified dicyclopentenyl di(meth)acrylate, ethylene oxide modified phosphate di(meth)acrylate, allylated cyclohexyl di(meth) acrylate, isocyanurate di(meth)acrylate, trimethylolpropane tri(meth)acrylate, ethylene oxide modified trimethylolpropane tri(meth)acrylate, dipentaerythritol tri(meth)acrylate, propionic acid modified dipentaerythritol tri(meth)acrylate, pentaerythritol tri(meth)acrylate, propylene oxide modified trimethylolpropane tri(meth)acrylate, tris(acryloxyethyl)isocyanurate, propionic acid modified dipentaerythritol penta (meth)acrylate, dipentaerythritol hexa(meth)acrylate, ethylene oxide modified dipentaerythritol hexa(meth)acrylate, caprolactone modified dipentaerythritol hexa(meth)acrylate, and the like are exemplified. These polyfunctional (meth) acrylates may be used alone, or in combination of two or more thereof. Of these, dipentaerythritol tri(meth)acrylate is preferred.

Furthermore, in addition to the polyfunctional (meth) acrylate, a monofunctional (meth)acrylate may be further included for the purpose of e.g., decreasing the viscosity. Examples of the monofunctional (meth)acrylate include methyl (meth)acrylate, ethyl (meth)acrylate, propyl (meth) acrylate, butyl (meth)acrylate, pentyl (meth)acrylate, hexyl (meth)acrylate, cyclohexyl (meth)acrylate, 2-ethylhexyl (meth)acrylate, lauryl (meth)acrylate, stearyl (meth)acrylate, isobornyl (meth)acrylate, and the like. These monofunctional (meth)acrylates may be used alone, or in combination of two or more thereof.

As the polymerizable oligomer, an oligomer having a radical polymerizable unsaturated group in its molecule is exemplified, and for example, an epoxy (meth)acrylate oligomer, a urethane (meth)acrylate oligomer, a polyester (meth)acrylate oligomer, a polyether (meth)acrylate oligomer and the like may be included.

The epoxy (meth)acrylate oligomer may be obtained by reacting, for example, an oxirane ring of a bisphenol epoxy resin or novolac epoxy resin having a comparatively low molecular weight with a (meth)acrylic acid to permit esterification. Alternatively, a carboxyl modified epoxy (meth) acrylate oligomer may be also used which is obtained by partially modifying the epoxy (meth)acrylate oligomer with a dibasic carboxylic anhydride. The urethane (meth)acrylate oligomer may be obtained by, for example, esterifying with a (meth)acrylic acid, a polyurethane oligomer obtained by a reaction of a polyether polyol and/or a polyester polyol with a polyisocyanate. The polyester (meth)acrylate oligomer may be obtained by, for example, esterifying with a (meth) acrylic acid, hydroxyl groups of a polyester oligomer having hydroxyl groups at both two ends obtained by condensation of a polyhydric carboxylic acid with a polyhydric alcohol. Alternatively, it is also possible to obtain the polyester (meth)acrylate oligomer by esterifying with a (meth)acrylic acid, hydroxyl groups at ends of an oligomer obtained by allowing an alkylene oxide to react with a polyhydric carboxylic acid. The polyether (meth)acrylate oligomer may be obtained by esterifying with a (meth)acrylic acid, hydroxyl groups of a polyether polyol.

Also, as the active energy ray-curable resin, an ultraviolet ray-curable epoxy resin may be suitably used. The ultraviolet ray-curable epoxy resin is exemplified by cured products of a bisphenol A epoxy resin, a glycidyl ether epoxy resin or the like. In the buffer sheet 22, due to the resin matrix 23a containing the ultraviolet ray-curable epoxy resin as a principal component, a desired uneven shape is more likely to be formed on the back face of the buffer layer 23 while volume shrinkage during hardening is inhibited. In addition, in the buffer sheet 22, due to the resin matrix 23a containing the ultraviolet ray-curable epoxy resin as a principal component, an increase in flexibility of the resin matrix 23a, and in turn more reliable inhibition of scratches on the plurality of prisms 15a on the second prism sheet 15 are enabled. Furthermore, in the case of using the ultraviolet ray-curable epoxy resin as the active energy ray-curable resin, it is preferred that no other polymerizable monomers and polymerizable oligomers, such as the aforementioned (meth)acrylate monomers and (meth)acrylate oligomers, are contained. This enables a further increase in flexibility, and in turn a further improvement of a scratch-inhibiting ability, of the resin matrix 23a.

When the ultraviolet ray-curable resin is used as the active energy ray-curable resin, it is desired that an initiator for photopolymerization is added in an amount of about 0.1 to 5 parts by mass with respect to 100 parts by mass of the resin. The initiator for photopolymerization is not particularly limited, and for the polymerizable monomer and/or the polymerizable oligomer having a radical polymerizable unsaturated group in its molecule, examples of the initiator include benzophenone, benzyl, Michler's ketone, 2-chlorothioxanthone, 2,4-diethylthioxanthone, benzoin ethyl ether, benzoin isopropyl ether, benzoin isobutyl ether, 2,2-diethoxyacetophenone, benzyl dimethyl ketal, 2,2-dimethoxy-1,2-diphenylethan-1-one, 2-hydroxy-2-methyl-1-phenylpropane-1-one, 1-hydroxycyclohexyl phenyl ketone, 2-methyl-1-[4-(methylthio)phenyl]-2-morpholinopropanone-1,1-[4-(2-hydroxyethoxy)-phenyl]-2-hydroxy-2-methyl-1-propan-1-one, bis(cyclopentadienyl)-bis [2,6-difluoro-3-(pyrrol-1-yl)phenyl] titanium, 2-benzyl-2-dimethylamino-1-(4-morpholinophenyl)-butanone-1,2,4,6-trimethylbenzoyldiphenyl phosphine oxide, and the like. Moreover, for the polymerizable oligomer having a cation polymerizable functional group in its molecule, etc., examples of the initiator include aromatic sulfonium salts, aromatic diazonium salts, aromatic iodonium salts, metallocene compounds, benzoinsulfonic acid esters, and the like. It is to be noted that these compounds may be used each alone, or as a mixture of a plurality of the compounds.

It is to be noted that the resin matrix 23a may contain additives in addition to the aforementioned synthetic resin. The additive is exemplified by a silicone additive, a fluorine additive, an antistatic agent, and the like. The content of the additive in terms of solid content equivalent with respect to 100 parts by mass of the synthetic resin component in the resin matrix 23a may be, for example, no less than 0.05 parts by mass and no greater than 5 parts by mass.

The resin beads 23b are resin particles having properties that transmit and diffuse rays of light. The resin beads 23b are formed from a transparent synthetic resin, in particular a colorless and transparent synthetic resin as a principal component. The principal component of the resin beads 23b is exemplified by an acrylic resin, an acrylonitrile resin, a polyurethane, a polyvinyl chloride, a polystyrene, a polyamide, a polyacrylonitrile, and the like. Of these, polyurethane and polyamide are preferred that are likely to increase flexibility of the projections 25.

The shape of the resin beads 23b is not particularly limited, and may be spherical, cuboidal, needle-shaped, rod-shaped, spindle-shaped, plate-like, scale-like, fibrous, or the like. Of these, a spherical shape having a superior isotropic light diffusibility and superior impact dispersibility upon the ball-drop test is preferred.

The resin beads 23b in the buffer layer 23 may be in contact with the back face of the substrate layer 24, but is preferably substantially spaced apart from the back face of the substrate layer 24. In the buffer sheet 22, the resin beads 23b may be fixed in the state of being spaced apart from the back face of the substrate layer 24, for example by using the active energy ray-curable resin as the principal component of the resin matrix 23a, through applying on the back face of the substrate layer 24 a coating liquid in which the resin beads 23b are dispersed in the active energy ray-curable resin, and curing the active energy ray-curable resin in a state in which the resin beads 23b are spaced apart from the back face of the substrate layer 24. In the buffer sheet 22, due to the resin beads 23b being substantially spaced apart from the back face of the substrate layer 24, the resin matrix 23a is also capable of dispersing the impact upon the ball-drop test. Accordingly, the resin beads 23b and the resin matrix 23a that covers both front and back sides of the resin beads 23b enable an improvement of the buffering properties of the plurality of projections 25. It is to be noted that the concept "resin beads being spaced apart from the back face of the substrate layer" also encompasses resin beads not in direct contact with the back face of the substrate layer, but in contact with other resin beads in contact with the back face of the substrate layer. It may be confirmed whether the resin beads are spaced apart from the back face of the substrate layer, for example by observing a cross section of the buffer sheet in a thickness direction by using a laser microscope.

In the case in which the resin beads 23b are spaced apart from the back face of the substrate layer 24, the lower limit of a proportion of the resin beads 23b spaced apart from the back face of the substrate layer 24 to all resin beads 23b is preferably 10%, more preferably 20%, and still more preferably 30%. When the proportion is less than the lower limit, the buffering properties of the plurality of projections 25 as a whole may not be sufficiently improved. Meanwhile, the upper limit of the proportion is not particularly limited, and may be, for example, 10%. It is to be noted that the term "proportion of the resin beads spaced apart from the back face of the substrate layer" as referred to means a proportion obtained by observing arbitrary five cross sections in the thickness direction of the buffer sheet by using a laser microscope, and averaging the proportion of the resin beads spaced apart from the back face of the substrate layer per unit length, which is 1 mm, on a lamination interface of the buffer layer with the substrate layer in each cross section.

The lower limit of the average particle diameter of the resin beads 23b is preferably 1.0 μm, more preferably 1.5 μm, and still more preferably 2.0 μm. Meanwhile, the upper limit of the average particle diameter of the resin beads 23b is preferably 15.0 μm, more preferably 12.0 μm, and still more preferably 10.0 μm. When the average particle diameter is less than the lower limit, the protrusion height of the plurality of projections 25 may be insufficient, and consequently, in the case in which the flat panel display undergoes an unintended impact due to falling and the like, the plurality of prisms 15a on the second prism sheet 15 may be less likely to be in scattered contact with the plurality of projections 25. Furthermore, when the average particle diameter is less than the lower limit, light diffusibility may be insufficient, and consequently lack in uniformity of the luminance caused by interference with the pixel pitch of the display element 17 and the like may not be sufficiently inhibited. To the contrary, when the average particle diameter is greater than the upper limit, too many projections 25 that are comparatively large may be formed, and consequently lack in uniformity of the luminance caused by interference with the pixel pitch of the display element 17 and the like may not be sufficiently inhibited. It is to be noted that the term "average particle diameter" as referred to means: an average particle diameter D50 on the volume-based particle size distribution calculated from a cumulative distribution measured by the laser diffraction method; or an average particle diameter obtained by dissolving the buffer layer or a surface of the buffer sheet in an organic solvent (e.g., toluene, MEK, a chlorine solvent, etc.), collecting particles by filtration, and then measuring a particle grade distribution according to the Coulter counter method.

The lower limit of the density of the resin beads 23b per unit area on the back face of the buffer layer 23 is preferably 300 beads/mm$^2$, more preferably 400 beads/mm$^2$, and still more preferably 500 beads/mm$^2$. Meanwhile, the upper limit of the density is preferably 500,000 beads/mm$^2$, more preferably 400,000 beads/mm$^2$, and still more preferably 50,000 beads/mm$^2$. When the density is less than the lower limit, the number of the projections 25 may be insufficient, and consequently, in the case in which the flat panel display undergoes an unintended impact due to falling and the like, the plurality of projections 25 may be less likely to be in appropriate contact with the plurality of prisms 15a on the second prism sheet 15. To the contrary, when the density is greater than the upper limit, the number of the projections 25 may be unnecessarily large, and consequently the rays of light entering from the back face side may be diffused excessively, whereby luminance of the flat panel display may be reduced. It is to be noted that the term "density of the resin beads per unit area on the back face of the buffer layer" as referred to means a value obtained by: irradiating the back face side of the buffer layer with a laser beam; scanning at arbitrary ten positions surface shapes of the plurality of projections formed on the back face of the buffer layer, and, from the laser images thus obtained, calculating an average of the density of resin beads per unit area (beads/mm$^2$).

The lower limit of the arithmetic average roughness Ra of the back face of the buffer layer 23 is preferably 0.2 μm, and more preferably 0.3 μm. Meanwhile, the upper limit of the arithmetic average roughness Ra of the back face of the buffer layer 23 is preferably 3.0 μm, and more preferably 2.5 μm. When the arithmetic average roughness Ra is less than the lower limit, the irregularities on the back face of the buffer layer 23 may be too small, and consequently in the case in which the flat panel display undergoes an unintended impact due to falling and the like, the plurality of projections 25 may be less likely to be in scattered contact with the plurality of prisms 15a on the second prism sheet 15. To the contrary, when the arithmetic average roughness Ra is greater than the upper limit, too many projections 25 that are comparatively large may be formed, and consequently lack in uniformity of the luminance caused by interference with the pixel pitch of the display element 17 and the like may not be sufficiently inhibited. It is to be noted that the term "arithmetic average roughness (Ra)" as referred to means a value as determined pursuant to JIS-B0601:2001, with a cut-off (λc) of 2.5 mm and an evaluation length of 12.5 mm.

The lower limit of the ten-point mean roughness Rz of the back face of the buffer layer 23 is preferably 1.0 μm, and more preferably 1.5 μm. Meanwhile, the upper limit of the ten-point mean roughness Rz of the back face of the buffer layer 23 is preferably 5.0 μm, and more preferably 4.5 μm. When the ten-point mean roughness Rz is less than the lower limit, the irregularities on the back face of the buffer layer 23 may be too small, and consequently in the case in which the flat panel display undergoes an unintended impact due to falling and the like, the plurality of projections 25 may be less likely to be in scattered contact with the plurality of prisms 15a on the second prism sheet 15. To the contrary, when the ten-point mean roughness Rz is greater than the upper limit, too many projections 25 that are comparatively large may be formed, and consequently lack in uniformity of the luminance caused by interference with the pixel pitch of the display element 17 and the like may not be sufficiently inhibited. It is to be noted that the term "ten-point mean roughness (Rz)" as referred to means a value as determined pursuant to JIS-B0601:1994, with a cut-off (λc) of 2.5 mm and an evaluation length of 12.5 mm.

The lower limit of the maximum height Ry of the back face of the buffer layer 23 is preferably 1.5 μm and more preferably 2.0 μm. Meanwhile, the upper limit of the maximum height Ry of the back face of the buffer layer 23 is preferably 10.0 μm and more preferably 8.0 μm. When the maximum height Ry is less than the lower limit, the irregularities on the back face of the buffer layer 23 may be too small, and consequently in the case in which the flat panel display undergoes an unintended impact due to falling and the like, the plurality of projections 25 may be less likely to be in scattered contact with the plurality of prisms 15a on the second prism sheet 15. To the contrary, when the maximum height Ry is greater than the upper limit, too many projections 25 that are comparatively large may be formed, and consequently lack in uniformity of the luminance caused by interference with the pixel pitch of the display element 17 and the like may not be sufficiently inhibited. It is to be noted that the term "maximum height (Ry)" as referred to means a value as determined pursuant to JIS-B0601:1994, with a cut-off (λc) of 2.5 mm and an evaluation length of 12.5 mm.

Substrate Layer

Since the substrate layer 24 needs to transmit rays of light, the substrate layer 35 is formed from a transparent synthetic resin, in particular a colorless and transparent synthetic resin as a principal component. The principal component of the substrate layer 24 is not particularly limited, and exemplified by polyethylene terephthalate, polyethylene naphthalate, an acrylic resin, polycarbonate, polystyrene, polyolefin, cellulose acetate, weather resistance vinyl chloride, and the like.

The lower limit of an average thickness of the substrate layer 24 is preferably 10 μm and more preferably 15 μm. Meanwhile, the upper limit of the average thickness of the substrate layer 24 is preferably 150 μm, more preferably 100 μm, and still more preferably 80 μm. When the average thickness of the substrate layer 24 is less than the lower limit, a curl may occur in a case where the buffer layer 23 is formed by coating. To the contrary, when the average thickness of the substrate layer 24 is greater than the upper limit, moisture permeability of the substrate layer 24 may be insufficient, and the requirement for a reduction in thickness of the flat panel display may not be satisfied. It is to be noted that the term "average thickness of the substrate layer" as referred to means an average of thicknesses at arbitrary 10 points of the substrate layer.

The lower limit of an average thickness of the buffer sheet 22 is preferably 12 μm and more preferably 15 μm. Meanwhile, the upper limit of the average thickness of the buffer sheet 22 is preferably 200 μm, more preferably 180 μm, still more preferably 150 μm, yet more preferably 130 μm, still yet more preferably 100 μm, particularly preferably 80 μm, and most preferably 50 μm. When the average thickness of the buffer sheet 22 is less than the lower limit, handleability may be deteriorated. In addition, an increase in width in an intermediate step of the production may become difficult, and consequently productivity may be significantly reduced. To the contrary, when the average thickness of the buffer sheet 22 is greater than the upper limit, moisture permeability of the buffer sheet 22 may be insufficient, and the requirement for a reduction in thickness of the flat panel display may not be satisfied. It is to be noted that the term "average thickness of the buffer sheet" as referred to means an average of thicknesses at arbitrary 10 points.

The lower limit of the haze value of the buffer sheet 22 is preferably 20% and more preferably 30%. Meanwhile, the upper limit of the haze value of the buffer sheet 22 is preferably 95% and more preferably 90%. When the haze value is less than the lower limit, light diffusibility may be insufficient, and consequently lack in uniformity of the luminance caused by interference with the pixel pitch of the display element 17 and the like may not be sufficiently inhibited. To the contrary, when the haze value is greater than the upper limit, the face luminance of the flat panel display may be insufficient.

The upper limit of a surface resistance value of the face of the buffer sheet 22 on the side to face the second prism sheet 15 is preferably $10 \times 10^{15} \Omega/\square$, more preferably $10 \times 10^{14} \Omega/\square$, and still more preferably $10 \times 10^{12} \Omega/\square$. When the surface resistance value is greater than the upper limit, the buffer capacity of the buffer layer 23 may be reduced due to a foreign substance attached to the back face of the buffer sheet 22. Meanwhile, the lower limit of the surface resistance value is not particularly limited, and, for example, may be $10 \times 10^{10} \Omega/\square$.

The buffer sheet 22 and the second prism sheet 15 disposed on the back face side of the buffer sheet 22 may be in contact with each other, or may be spaced apart from each other as illustrated in FIG. 4. In the case in which the buffer sheet 22 and the second prism sheet 15 disposed on the back face side of the buffer sheet 22 are spaced apart from each other, the lower limit of an average distance between the buffer sheet 22 and the apexes of the plurality of prisms 15a on the second prism sheet 15, specifically an average distance D between the back face of the buffer sheet 23, and the apexes of the plurality of prisms 15a on the second prism sheet 15, is preferably 10 μm and more preferably 20 μm. Meanwhile, the upper limit of the average distance D is preferably 1,000 μm, and more preferably 10 μm. When the average distance D is less than the lower limit, the buffer sheet 22 and the plurality of prisms 15a on the second prism sheet 15 are more likely to be unintentionally brought into contact with each other, which may lead to an increased likelihood of formation of scratches on the plurality of prisms 15a. To the contrary, when the average distance D is greater than the upper limit, the requirement for a reduction in thickness of the flat panel display may not be satisfied. In this regard, with the average distance D falling within the above range, the buffer sheet 22 is capable of sufficiently inhibiting scratches on the plurality of prisms 15a on the second prism sheet 15 even when a comparatively great impact is applied on the flat panel display. It is to be noted that the term "average distance" as referred to means an average of distance s at arbitrary 10 points.

Figure 5:
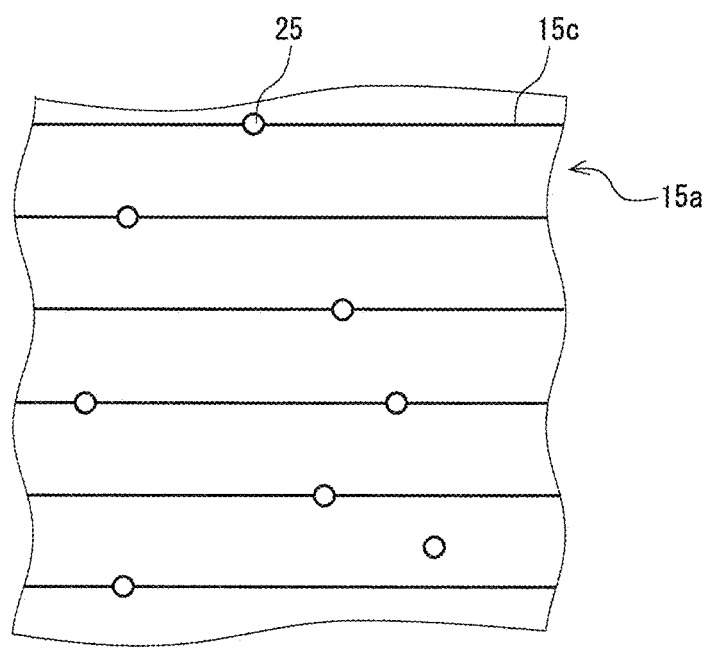
FIG. 5 is a schematic plan view showing a positional relationship between the buffer sheet and the prism sheet illustrated in FIG. 4.

The plurality of projections 25 are provided in order to prevent: adhesion between the buffer sheet 22 and the plurality of prisms 15a on the second prism sheet 15, light leaking, bright lines, and lack in uniformity of the luminance. As illustrated in FIG. 5, the plurality of projections 25 are formed at positions overlapping the apexes 15c of the plurality of prisms 15a on the second prism sheet 15 in a planar view. The buffer sheet 22 is configured to inhibit light leaking, bright lines, and lack in uniformity of the luminance caused by the adhesion between the buffer sheet 22 and the ridge lines, due to the scattered contact of the plurality of projections 25 with the apexes of the plurality of prisms 15a on the second prism sheet 15 when the flat panel display undergoes an unintended impact.

Polarizer

As the polarizer 20 which may be employed, well-known polarizers such as an iodine polarizer, a dye polarizer, a polyethylene polarizer, and the like are exemplified. The polarizer 20 and the substrate layer 24 of the buffer sheet 22 are adhered to each other by means of a well-known adhesive such as a water soluble adhesive, an active energy ray-curable adhesive, and the like.

Front Face Side Polarizer Protection Sheet

As the front face side polarizer protection sheet 21, a well-known polarizer protection sheet containing a cellulose ester as a principal component, for example, may be used. The polarizer 20 and the front face side polarizer protection sheet 21 may be adhered to each other by means of a well-known adhesive such as a water soluble adhesive and the like.

Display Element

The display element 17 has a function of controlling the amount of the rays of light to be transmitted. Any of various well-known display element may be employed as the display element 17. The display element 17 is typically a laminated structure constituted of a substrate, a color filter, a counter electrode, a liquid crystal layer, a pixel electrode, a substrate, and the like. As the pixel electrode, a transparent conductive film such as ITO is used. A display mode of the display element 17 is exemplified by currently proposed display modes such as TN (Twisted Nematic), IPS (In-Plane Switching), FLC (Ferroelectric Liquid Crystal), AFLC (Anti-ferroelectric Liquid Crystal), OCB (Optically Compensatory Bend), STN (Supper Twisted Nematic), VA (Vertically Aligned), HAN (Hybrid Aligned Nematic), and the like.

First Polarizing Plate

The specific constitution of the first polarizing plate 18 is not particularly limited. The first polarizing plate 18 may be configured by, for example, overlaying the well-known polarizer protection sheet containing a cellulose ester as a principal component on both faces of the well-known polarizer such as an iodine polarizer, a dye polarizer or a polyethylene polarizer.

Optical Waveguide Sheet

As described above, the optical waveguide sheet 11 allows the rays of light having entered from the end face to exit from the front face substantially uniformly. The optical waveguide sheet 11 is formed into a plate (non-wedge shape) that is substantially rectangular-shaped in a planar view and has a substantially uniform thickness. The optical waveguide sheet 11 includes on the back face side thereof, a plurality of recessed portions 11a falling toward the front face side. Furthermore, the optical waveguide sheet 11 includes on the back face side thereof, sticking preventive parts. Specifically, the optical waveguide sheet 11 includes a plurality of raised parts lib, as the sticking preventive parts, which are present around the plurality of recessed parts 11a and protrude toward the back face side. The raised parts 11b are provided to be adjacent to the recessed parts 11a, and the inner lateral face of each raised part 11b is continuous with the surface of the adjacent recessed part 11a. The optical waveguide sheet 11 is constituted as a single-layered structure including a synthetic resin as a principal component.

The lower limit of the average thickness of the optical waveguide sheet 11 is preferably 100 μm, more preferably 150 μm, and still more preferably 200 μm. Meanwhile, the upper limit of the average thickness of the optical waveguide sheet 11 is preferably 1,000 μm, more preferably 800 and still more preferably 750 μm. When the average thickness of the optical waveguide sheet 11 is less than the lower limit, the strength of the optical waveguide sheet 11 may be insufficient, and a sufficient amount of rays of light from the light source 12 may not be introduced to the optical waveguide sheet 11. To the contrary, when the average thickness of the optical waveguide sheet 11 is greater than the upper limit, the requirement for a reduction in thickness of the flat panel display may not be satisfied.

Since the optical waveguide sheet 11 needs to be translucent, the optical waveguide sheet 11 is formed from a transparent, in particular colorless and transparent resin as a principal component. The principal component of the optical waveguide sheet 11 is not particularly limited, and is exemplified by synthetic resins such as polycarbonate superior in transparency, strength, etc., and an acrylic resin superior in transparency and scuff resistance, etc. Of these, polycarbonate is preferred as the principal component of the optical waveguide sheet 11. Since the polycarbonate has superior transparency and a high refractive index, total reflection is likely to occur on interfaces with air layers (a layer formed in a gap with the light diffusion sheet 13 disposed on the front face side of the optical waveguide sheet 11, and a layer formed in a gap with the reflection sheet 16 disposed on the back face side of the optical waveguide sheet 11) and consequently the rays of light are enabled to efficiently propagate. Furthermore, since polycarbonate is heat resistant, deterioration thereof due to heat generation of the light source 12 is less likely to occur.

Light Source

The light source 12 is disposed such that an emission surface faces to (or abuts) the end face of the optical waveguide sheet 11. Various types of light sources can be used as the light source 12, and for example, a light emitting diode (LED) can be used as the light source 12. Specifically, a light source in which a plurality of light emitting diodes are arranged along one end face of the optical waveguide sheet 11 may be used as the light source 12.

Light Diffusion Sheet

The light diffusion sheet 13 includes a substrate layer 13a, a light diffusion layer 13b disposed on the front face side of the substrate layer 13a, and a sticking preventive layer 13c disposed on the back face side of the substrate layer 13a.

Since the substrate layer 13a needs to transmit rays of light, the substrate layer 13a is formed from a transparent synthetic resin, in particular a colorless and transparent synthetic resin as a principal component. The principal component of the substrate layer 13 is not particularly limited, and exemplified by polyethylene terephthalate, polyethylene naphthalate, an acrylic resin, polycarbonate, polystyrene, polyolefin, cellulose acetate, weather resistance vinyl chloride, and the like. Of these, polyethylene terephthalate being superior in transparency and strength is preferred, and polyethylene terephthalate having an ameliorated deflection performance is particularly preferred.

The lower limit of an average thickness of the substrate layer 13a is preferably 10 µm, more preferably 35 µm, and still more preferably 50 µm. Meanwhile, the upper limit of the average thickness of the substrate layer 13a is preferably 500 µm, more preferably 250 µm, and still more preferably 188 µm. When the average thickness of the substrate layer 13a is less than the lower limit, a curl may occur in a case where the light diffusion layer 13b and the sticking preventive layer 13c are formed by coating. To the contrary, when the average thickness of the substrate layer 13a is greater than the upper limit, the luminance of the flat panel display may be reduced, and the requirement for a reduction in thickness of the flat panel display may not be satisfied.

The light diffusion layer 13b contains a light diffusing agent and a binder therefor. The light diffusion layer 13b contains the light diffusing agent in a dispersed manner with a substantially uniform density. The light diffusing agent is surrounded by the binder. The light diffusion layer 13b allows the rays of light transmitting from the back face side to the front face side to diffuse substantially uniformly, due to the light diffusing agent being contained in a dispersed manner. Furthermore, in the light diffusion layer 13b, a fine uneven shape is formed substantially uniformly by the light diffusing agent on the front face, and each recessed part and each protruding part of the fine uneven shape is formed in a lens-like shape. By a lens-like effect of the fine uneven shape, the light diffusion layer 13b exhibits a superior light diffusion function, and has a refraction function that refracts the transmitted rays of light in a normal direction as well as a light condensing function that condenses the transmitted rays of light macroscopically in a normal direction due to this light diffusion function.

The light diffusing agent is particles having a property of diffusing rays of light, and may be roughly classified into inorganic fillers or organic fillers. The inorganic filler is exemplified by silica, aluminum hydroxide, aluminum oxide, zinc oxide, barium sulfide, magnesium silicate, and a mixture thereof. A specific component of the organic filler is exemplified by an acrylic resin, an acrylonitrile resin, a polyurethane, a polyvinyl chloride, a polystyrene, a polyamide, a polyacrylonitrile, and the like. Of these, an acrylic resin that is superior in transparency is preferred, and polymethyl methacrylate (PMMA) is particularly preferred.

The shape of the light diffusing agent is not particularly limited, and may be spherical, cuboidal, needle-shaped, rod-shaped, spindle-shaped, plate-like, scale-like, fibrous, and the like. Of these, a spherical bead superior in light diffusibility is preferred.

The lower limit of the average particle diameter of the light diffusing agent is preferably 1 µm, more preferably 2 µm, and still more preferably 5 µm. Meanwhile, the upper limit of the average particle diameter of the light diffusing agent is preferably 50 µm, more preferably 20 µm, and still more preferably 15 µm. When the average particle diameter of the light diffusing agent is less than the lower limit, the uneven shape on the front face of the light diffusion layer 13b may be unsatisfactory, and thus the light diffusibility required for the light diffusion sheet 13 may not be satisfied. To the contrary, when the average particle diameter of the light diffusing agent is greater than the upper limit, the thickness of the light diffusion sheet 13 increases, and a uniform diffusion of rays of light may be difficult.

The lower limit of the blended amount of the light diffusing agent (the blended amount, in terms of solid content equivalent, with respect to 100 parts by mass of a polymer in a polymer composition as a material for forming the binder) is preferably 10 parts by mass, more preferably 20 parts by mass, and still more preferably 50 parts by mass. Meanwhile, the upper limit of the blended amount of the light diffusing agent is preferably 500 parts by mass, more preferably 300 parts by mass, and still more preferably 200 parts by mass. When the blended amount of the light diffusing agent is less than the lower limit, the light diffusibility may be insufficient. To the contrary, when the blended amount of the light diffusing agent is greater than the upper limit, the light diffusing agent may not be fixed by the binder securely.

The binder is formed by hardening (crosslinking, etc.) a polymer composition containing a base polymer. The light diffusing agent is provided to be fixed by the binder on the entire front face of the substrate layer 13a with a substantially equal density. It is to be noted that a polymer composition for forming the binder may be appropriately blended with a fine inorganic filler, a hardening agent, a plasticizer, a dispersant, various types of levelling agents, an antistatic agent, a UV absorbent, an ultraviolet ray-absorbing agent, an anti-oxidizing agent, a viscosity modifier, a lubricant, a light stabilizer, and the like.

The sticking preventive layer 13c is formed by dispersing resin beads in a resin matrix. The resin beads are arranged scatteredly on the back face side of the substrate layer 13a. Due to the resin beads being arranged scatteredly, the sticking preventive layer 13c includes a plurality of protruding parts arising from the resin beads, and a planar part with no resin beads. Owing to the plurality of protruding parts, the sticking preventive layer 13c is in scattered contact with the optical waveguide sheet 11 disposed on the back face side thereof, but is not in an entire contact on the back face thereof, thereby preventing sticking and in turn inhibiting lack in uniformity of the luminance of the flat panel display.

Prism Sheet

As described above, the first prism sheet 14 allows the rays of light having entered from the light diffusion sheet 13 to be refracted in a normal direction and then to exit toward the second prism sheet 15. Then, as described above, the second prism sheet 15 emits the rays of light having entered from the first prism sheet 14 toward the front face side, such that the emitted rays of light travel substantially perpendicularly to the back face of the display panel 2. The second prism sheet 15 is disposed on the outermost surface side of the backlight unit 1. Since the first prism sheet 14 and the second prism sheet 15 need to transmit rays of light, the first prism sheet 14 and the second prism sheet 15 are formed from a transparent synthetic resin, in particular a colorless and transparent synthetic resin as a principal component. The first prism sheet 14 and the second prism sheet 15 include the substrate layers 14b and 15b, and the plurality of prisms 14a and 15a overlaid on the surface of the substrate layers 14b and 15b, respectively. As described above, the plurality of prisms 14a on the first prism sheet 14 are continuously provided in the width direction such that the ridge lines are parallel, thereby constituting the prism array. In addition, as described above, the plurality of prisms 15a on the second prism sheet 15 are continuously provided in the width direction such that the ridge lines are parallel, thereby constituting the prism array. The ridge line direction of the prism arrays on the first prism sheet 14 is substantially perpendicular to the ridge line direction of the prism arrays on the second prism sheet 15.

It is preferred that the prisms 15a on the second prism sheet 15 each have a constant axial height. In addition, it is preferred that the apexes of the plurality of prisms 15a on the second prism sheet 15 have an equal height. Due to such a configuration, the apexes of the plurality of prisms 15a on the second prism sheet 15 are likely to be in scattered contact with the plurality of projections 25 on the buffer sheet 22, and consequently inhibition of scratches on the plurality of prisms 15a on the second prism sheet 15 is facilitated. In light of more reliable inhibition of scratches on the plurality of prisms 15a on the second prism sheet 15, it is preferred that the prisms 14a on the first prism sheet 14 each have a constant axial height. In addition, it is preferred that the apexes of the plurality of prisms 14a on the first prism sheet 14 have an equal height.

The lower limit of the thickness of the first prism sheet 14 and the second prism sheet 15 (height of the apexes of the plurality of prisms 14a and 15a from the back face of the substrate layers 14b, 15b) is preferably 20 μm, and more preferably 40 μm. Meanwhile, the upper limit of the thickness of the first prism sheet 14 and the second prism sheet 15 is preferably 300 μm, more preferably 200 μm, and still more preferably 180 μm. An average height of the plurality of prisms 14a, 15a on the first prism sheet 14 and the second prism sheet 15 (average height from the base to the apex of the plurality of prisms) is preferably no less than 8 μm and no greater than 200 μm. The lower limit of the pitch of the plurality of prisms 14a, 15a on the first prism sheet 14 and the second prism sheet 15 is preferably 4 μm, more preferably 10 μm, and still more preferably 20 μm. Meanwhile, the upper limit of the pitch of the plurality of prisms 14a, 15a on the first prism sheet 14 and the second prism sheet 15 is preferably 100 μm and more preferably 60 μm.

Each of the prisms 14a, 15a on the first prism sheet 14 and the second prism sheet 15 preferably has a substantially triangular prism shape. In the case in which each of the prisms 14a, 15a on the first prism sheet 14 and the second prism sheet 15 has a triangular prism shape, an apex angle of each of the prisms 14a, 15a is preferably no less than 75° and no greater than 95°.

Reflection Sheet

The reflection sheet 16 is exemplified by: a white sheet in which a filler is contained in a dispersion state in a base resin such as polyester; a mirror sheet obtained by vapor deposition of a metal such as aluminum and silver on the front face of a film made of a polyester or the like to enhance regular reflection properties; and the like.

Advantages

Due to being disposed to face the plurality of prisms 15a on the second prism sheet 15 and having the average microindentation hardness no greater than the aforementioned upper limit, the buffer sheet 22 of the embodiment is capable of sufficiently inhibiting scratches on the plurality of prisms 15a in the case of falling and the like of the flat panel display including the buffer sheet 22. More specifically, the buffer sheet 22 is provided which has reduced damage even after conducting a severe test method called the ball-drop test (described later).

In addition, in the buffer sheet 22, due to the plurality of projections 25 provided on the side to face the second prism sheet 15, the plurality of prisms 15a on the second prism sheet 15 are likely to be in scattered contact with the plurality of projections 25. Accordingly, since the apexes of the plurality of prisms 15a on the second prism sheet 15 are not entirely in contact with the back face of the buffer sheet 22, the buffer sheet 22 is capable of inhibiting scratches on the plurality of prisms 15a more reliably.

Due to the buffer sheet 22 being a polarizer protection sheet to be overlaid on the polarizer 20 disposed on a face on an opposite side to a display face of the display element 17, which is a liquid crystal cell, promotion of a reduction in thickness is enabled owing to a reduction in the number of required parts.

In the flat panel display, due to the buffer sheet 22 of the present embodiment being disposed between the second prism sheet 15 and the display element 17, sufficient inhibition of scratches on the plurality of prisms 15a on the second prism sheet 15 is enabled even in the case of the plurality of prisms 15a bumping against the buffer sheet 22.

Production Method of Buffer Sheet

A production method of the buffer sheet 22 according to the present embodiment includes the step of forming a sheet element constituting the substrate layer 24 (substrate layer forming step), and overlaying the buffer layer 23 on one face side of the sheet element (buffer layer overlaying step).

Substrate Layer Forming Step

The substrate layer forming step is not particularly limited, and is exemplified by a process of forming a sheet element by: extrusion molding a melted thermoplastic resin from a T die; and then stretching the extrusion-molded product thus obtained in the longitudinal direction and the width direction of the layer. Examples of the well-known extrusion molding using a T die include the polishing roll process and the chill roll process. Examples of the stretching process for the sheet element include a tubular film biaxial stretching process, a flat film biaxial stretching process, and the like.

Buffer Layer Overlaying Step

The buffer layer overlaying step includes preparing a coating liquid containing a material for the resin matrix 23a and the resin beads 23b (preparation substep), applying the coating liquid prepared in the preparation substep on the one face side of the sheet element (application substep), and drying to harden the coating liquid applied in the application substep (hardening substep).

In the preparation substep, it is preferred that the coating liquid is prepared which contains the active energy ray-curable resin as the material for the resin matrix 23a. In the production method of the buffer sheet, due to using the active energy ray-curable resin as the material for the resin matrix 23a, comparatively rapid hardening of the active energy ray-curable resin is enabled by irradiating with, for example, an ultraviolet ray in the hardening substep following the application of the coating liquid in the application substep. Thus, due to curing the active energy ray-curable resin in a state in which the resin beads 23b are spaced apart from the one face of the sheet element, fixing of the resin beads 23b in a state of being spaced apart from the one face of the sheet element is facilitated.

In the hardening substep, the buffer layer 23 in which the plurality of projections 25 arising from the resin beads 23b protrude from one face is formed by hardening the coating liquid.

It is to be noted that the production method of the buffer sheet may further include, prior to the buffer layer overlaying step, a surface treatment step of subjecting the face of the sheet element, on which the buffer layer 23 is to be overlaid, to a treatment such as a corona discharge treatment, an ozone treatment, a low temperature plasma treatment, a glow discharge treatment, an oxidization treatment, a primer coating treatment, an undercoating treatment, and an anchor coating treatment.

Other Embodiments

The above-described embodiment does not limit the constitution of the present invention. Therefore, constitutive elements of each part of the above-described embodiment may be omitted, replaced, or added based on the descriptions of the present specification and the common technical knowledge, and such omission, replacement, and addition should be construed as falling within the scope of the present invention.

For example, the buffer sheet according to the present embodiment does not necessarily require the substrate layer and may also be a single-layered structure with the buffer layer. Alternatively, the buffer sheet may have other layer(s) between the substrate layer and the buffer layer, or on the front face side of the substrate layer.

The buffer layer does not necessarily contain the resin matrix and the resin beads dispersed in the resin matrix. Specifically, the buffer layer may also be: a foamed resin layer containing a synthetic resin as a principal component and including a plurality of air bubbles therein; a resin layer formed by using a die having a plurality of recessed parts, with projections having inverted shapes of the recessed parts on the die; a resin layer having a plurality of projections on the back face due to containing a plurality of types of resins that are immiscible; or a resin layer having a plurality of projections on the back face due to being overlaid on a back face of a substrate layer, the back face having a plurality of projections.

In the buffer sheet, the plurality of projections are not necessarily provided on a face on a side to face the prism sheet. Due to having the average microindentation hardness of no greater than the aforementioned upper limit, the buffer sheet of the embodiment is capable of sufficiently inhibiting damage on the plurality of prisms in the case of falling and the like of the flat panel display including the buffer sheet. It is to be noted that in the case of the buffer sheet not having the plurality of projections, the buffer sheet may or may not have light diffusibility.

The flat panel display of the above embodiment is not necessarily required to be a liquid crystal display device. In addition, even in the case in which the flat panel display is a liquid crystal display device, the buffer sheet is not required to be a polarizer protection sheet to be overlaid on the polarizer disposed on a face on an opposite side to a display face of the liquid crystal cell. The buffer sheet may be, for example, overlaid on the back face side of a well-known polarizer protection sheet containing cellulose ester as a principal component. In addition, even in the case in which the buffer sheet is the polarizer protection sheet, the buffer sheet may be overlaid on the polarizer via other layer, film, or the like.

Figure 6:
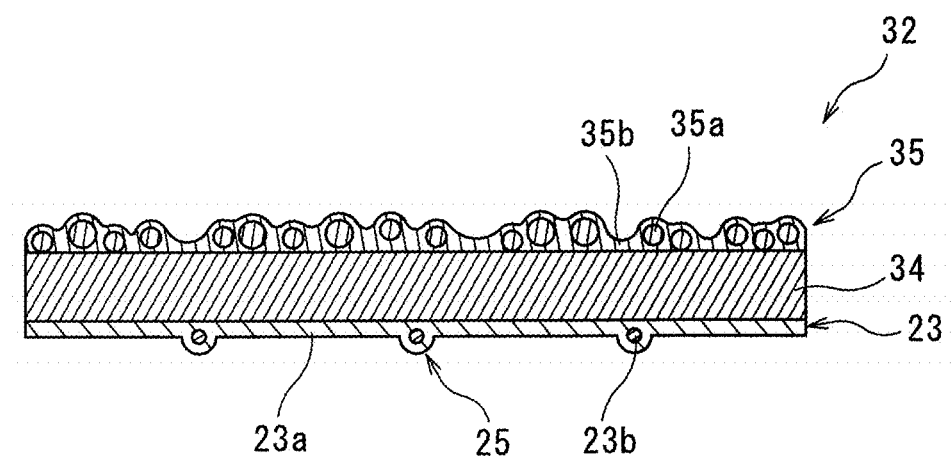
FIG. 6 is a schematic end view of a buffer sheet according to a different embodiment from that of the buffer sheet illustrated in FIG. 3.

As illustrated in FIG. 6, the buffer sheet 32 may also be a light diffusion sheet for use at the top, to be disposed on the front face side of a prism sheet (the second prism sheet 15 in the first embodiment described above). The buffer sheet 32 illustrated in FIG. 6 includes a substrate layer 34, a light diffusion layer 35 disposed on the front face side of the substrate layer 34, and the buffer layer 23 disposed on the back face side of the substrate layer 34. The buffer layer 23 is configured as a layer arranged on the back face of the buffer sheet 32. The specific constitution of the buffer layer 23 may be the same as the buffer layer 23 in the buffer sheet 22 for the flat panel display illustrated in FIG. 1. Meanwhile, the specific constitution of the substrate layer 34 may be similar to the substrate layer 13a in the light diffusion sheet 13 for the flat panel display illustrated in FIG. 1. The light diffusion layer 35 contains a light diffusing agent 35a and a binder 35b therefor. The light diffusion layer 35 does not require light diffusibility as high as that of the light diffusion layer 13b in the light diffusion sheet 13 in FIG. 1. In this respect, the lower limit of the blended amount of the light diffusing agent 35a is preferably 0.1 parts by mass and more preferably 5 parts by mass. Meanwhile, the upper limit of the blended amount of the light diffusing agent 35a is preferably 40 parts by mass and more preferably 30 parts by mass. The lower limit of the average particle diameter of the light diffusing agent 35a is preferably 1 μm and more preferably 2 μm. Meanwhile, the upper limit of the average particle diameter of the light diffusing agent 35a is preferably 10 μm and more preferably 6 μm.

The specific configurations of the display element and the backlight unit in the flat panel display are not particularly limited. The backlight unit may include other optical sheet(s) such as a micro lens sheet, and may include only one prism sheet instead of the first prism sheet 14 and the second prism sheet 15 described above. The backlight unit is may also be a direct-lit backlight unit. Furthermore, even in a case where the backlight unit is an edge-lit backlight unit, it is not necessarily a unilateral edge-lit backlight unit in which a plurality of LEDs are provided along only one end face of an optical waveguide sheet, and may be a bilateral edge-lit backlight unit in which a plurality of LEDs are provided along a pair of opposite end faces of the optical waveguide sheet or an entire circumference edge-lit backlight unit in which a plurality of LEDs are provided along each end face of the optical waveguide sheet.

The flat panel display is preferably a portable terminal having a comparatively small-sized screen such as a smartphone, a tablet terminal or the like, buy may also be a display device having a comparatively large-sized screen such as a personal computer (e.g., a laptop computer), a liquid crystal television or the like. In other words, the present invention may be suitably applied to any flat panel display employed in electronic instruments and devices that are liable to be accidentally dropped during carrying in regular life or working.

EXAMPLES

Hereinafter, the embodiment of the present invention will be explained in detail by way of Examples; however, the present invention is not in any way limited to these Examples.

Examples (No. 1)

Figure 7:
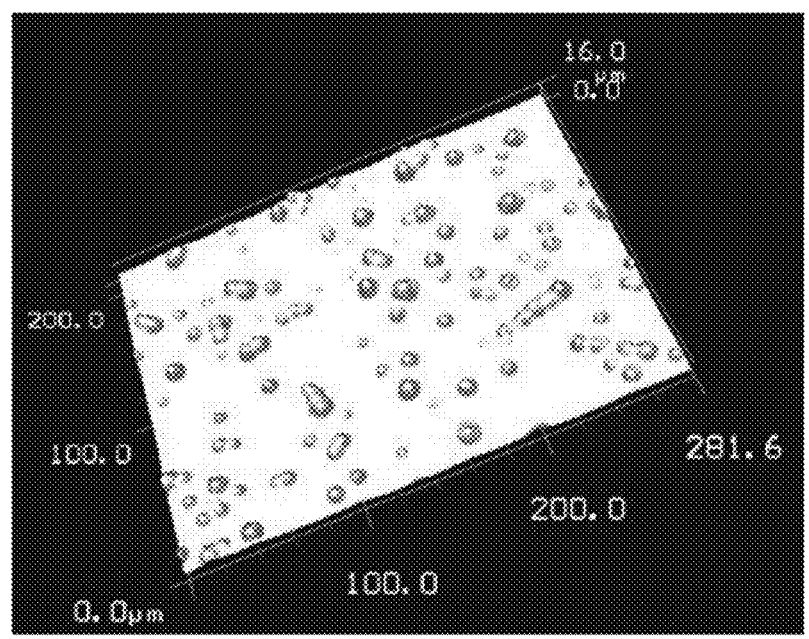
FIG. 7 shows a laser micrograph of a buffer sheet No. 1 after image processing.
Figure 8:
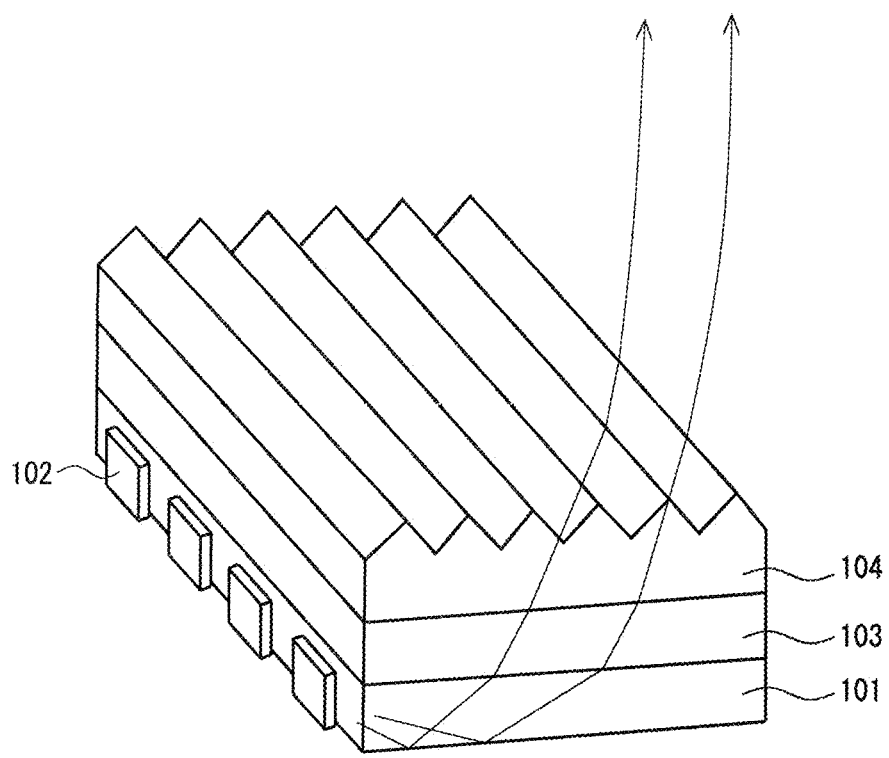
FIG. 8 is a schematic perspective view illustrating a conventional edge-lit backlight unit.

Into 15 parts by mass of acrylic polyol ("A-807-BA" available from DIC) employed as a material for a resin matrix were mixed 1.3 parts by mass of resin beads having an average particle diameter of 7 μm formed from cross-linked urethane polymer ("UCN-5070D" available from Dainichiseika Color & Chemicals Mfg. Co., Ltd.), 2.2 parts by mass of an isocyanate curing agent ("CORONATE HL" available from Tosoh Corporation), and 0.4 parts by mass of an anionic surfactant ("ELECTRO STRIPPER (registered trademark) ME2" available from Kao Corporation). The composition thus obtained after the mixing was diluted with 20 parts by mass of methyl ethyl ketone, and the diluted solution was applied on a polyethylene terephthalate (PET) film having an average thickness of 23 μm. Initial hardening was then carried out by heating at 100° C. for 1 min. Subsequent to the initial hardening, aging was carried out at 60° C. for 24 hrs to harden the coated film. A buffer sheet No. 1 having a coating layer (buffer layer) on one face of a substrate layer constituted of the PET film was thus obtained. The coating amount and the average thickness of the coating layer are shown in Table 1. FIG. 7 shows a laser micrograph of the buffer sheet No. 1 after image processing.

(No. 2)

Into 15 parts by mass of acrylic polyol ("A-807-BA" available from DIC) employed as a material for a resin matrix were mixed 1.5 parts by mass of resin beads having an average particle diameter of 7 μm formed from an acrylic resin ("RUB230 (7M) EJ" available from Dainichiseika Color & Chemicals Mfg. Co., Ltd.), 2.2 parts by mass of an isocyanate curing agent ("CORONATE HL" available from Tosoh Corporation), and 0.4 parts by mass of an anionic surfactant ("ELECTRO STRIPPER ME2" available from Kao Corporation). The composition thus obtained after the mixing was diluted with 20 parts by mass of methyl ethyl ketone, and the diluted solution was applied on a PET film having an average thickness of 23 μm. Initial hardening was then carried out by heating at 100° C. for 1 min. Subsequent to the initial hardening, aging was carried out at 60° C. for 24 hrs to harden the coated film. A buffer sheet No. 2 having a coating layer (buffer layer) on one face of a substrate layer constituted of the PET film was thus obtained. The coating amount and the average thickness of the coating layer are shown in Table 1.

(No. 3)

Into 15 parts by mass of ultraviolet ray-curable urethane acrylate ("UV-268" available from Natoco Co., Ltd.) employed as a material for a resin matrix were mixed 4.2 parts by mass of resin beads having an average particle diameter of 7 μm formed from an acrylic resin ("RUB230 (7M) EJ" available from Dainichiseika Color & Chemicals Mfg. Co., Ltd.), and 1.2 parts by mass of an ion-conductive antistatic agent ("SBZ-M16L2KAI" available from Marubishi Oil Chemical Corporation). The composition thus obtained after the mixing was diluted with 15 parts by mass of methyl ethyl ketone, and the diluted solution was applied on a PET film having an average thickness of 23 μm. The solvent was removed by heating at 100° C. for 1 min. The coated film was irradiated with an ultraviolet ray at an irradiation dose of 20 mJ to harden. A buffer sheet No. 3 having a coating layer (buffer layer) on one face of a substrate layer constituted of the PET film was thus obtained. The coating amount and the average thickness of the coating layer are shown in Table 1.

(No. 4)

Into 15 parts by mass of ultraviolet ray-curable urethane acrylate ("UV-268" available from Natoco Co., Ltd.) employed as a material for a resin matrix, 1.8 parts by mass of resin beads having an average particle diameter of 4 μm formed from an acrylic-styrene resin ("ST4003F" available from Nippon Shokubai Co., Ltd.) were mixed. The composition thus obtained after the mixing was diluted with 15 parts by mass of methyl ethyl ketone, and the diluted solution was applied on a PET film having an average thickness of 23 μm. The solvent was removed by heating at 100° C. for 1 min. The coated film was irradiated with an ultraviolet ray at an irradiation dose of 20 mJ to harden. A buffer sheet No. 4 having a coating layer (buffer layer) on one face of a substrate layer constituted of the PET film was thus obtained. The coating amount and the average thickness of the coating layer are shown in Table 1.

(No. 5)

A buffer sheet No. 5 was obtained by a similar procedure to that of No. 1 except that the proportion of the resin beads contained was 0.7 parts by mass with respect to 15 parts by mass of the acrylic polyol employed as the material for the resin matrix. The coating amount and the average thickness of the coating layer (buffer layer) in the buffer sheet No. 5 are shown in Table 1.

(No. 6)

A buffer sheet No. 6 was obtained by a similar procedure to that of No. 1 except that the proportion of the resin beads contained was 4.2 parts by mass with respect to 15 parts by mass of the acrylic polyol employed as the material for the resin matrix. The coating amount and the average thickness of the coating layer (buffer layer) in the buffer sheet No. 6 are shown in Table 1.

Comparative Examples (No. 7)

According to Example 1 in Japanese Unexamined Patent Application, Publication No. 2000-75134, into 15 parts by mass of ultraviolet ray-curable urethane acrylate ("UV-268" available from Natoco Co., Ltd.) employed as a material for a resin matrix were mixed 2.1 parts by mass of resin beads having an average particle diameter of 4 μm formed from an acrylic-styrene resin ("ST4003F" available from Nippon Shokubai Co., Ltd.), and 0.5 parts by mass of porous amorphous silica having an average particle diameter of 2.7 μm ("SYLOPHOBIC 507" available from Fuji Silysia Chemical Ltd.). The composition thus obtained after the mixing was diluted with 15 parts by mass of methyl ethyl ketone, and the diluted solution was applied on a PET film having an average thickness of 23 μm. The solvent was removed by heating at 100° C. for 1 min. The coated film was irradiated with an ultraviolet ray at an irradiation dose of 20 mJ to harden. A sheet No. 7 having a coating layer on one face of a substrate layer constituted of the PET film was thus obtained. The coating amount and the average thickness of the coating layer are shown in Table 1.

(No. 8)

A polarizing plate with a luminance-improving film incorporated in "iPhone (registered trademark) 6" available from Apple, Inc. (U.S.) was removed and used as a sheet No. 8.

Quality Evaluation

Average Microindentation Hardness

Using an ultra-microindentation hardness tester "ENT-1100a" available from Elionix Inc. in a measurement environment at 27° C., 10 projections on the coating layer (for the sheet No. 8, the luminance-improving film) of each of the sheets Nos. 1 to 8 were indented with a Berkovich diamond indenter under the maximum load of 5 mN and at a load velocity of 0.5 mN/sec, then the indented state was maintained for 1 sec, and thereafter the indenter was unloaded at the same velocity. In regard to the measurement site (projection), a measurement position was determined by a microscopic examination. A value ($F_{max}$/Ap(hc)) calculated by dividing a maximum load ($F_{max}$) by a contact projected area (Ap(hc)) of the indenter at a contact indentation depth (hc) was obtained as a microindentation hardness. An average of values of the hardness obtained at the 10 points, excluding the greatest and second greatest values, as well as the smallest and second smallest values, was obtained as the average microindentation hardness. It is to be noted that the contact indentation depth (hc) as referred to means a value obtained by the following formula:

$$hc = h_{max} - \varepsilon(h_{max} - hr)(\varepsilon = 0.75),$$

wherein $h_{max}$ is the maximum indentation depth; and hr is an intercept where a linear line intersects with a displacement axis, the linear line being derived from a linear approximation, provided that an initial portion of an unloading curve is linear Table 1 shows the measurement results.

Haze Value

Haze values of the sheets Nos. 1 to 7 were measured pursuant to JIS-K7136:2000 by using HZ-2 available from Suga Test Instruments Co., Ltd. Table 1 shows the measurement results. It is to be noted that a haze value was not measured for the sheet No. 8 that has the luminance-improving film overlaid on the polarizing plate.

Surface Resistance Value

A surface resistance value of the coating layer (for the sheet No. 8, the luminance-improving film) in each of the sheets Nos. 1 to 8 was measured using SM-8220 and SME-8310 available from DKK-TOA CORPORATION, pursuant to JIS-K6911:2006 at 23° C. and 50% RH, after leaving to stand at 23° C. and 50% RH for 24 hrs. Table 1 shows the measurement results.

Moire Evaluation

Each of the sheets Nos. 1 to 8 was incorporated in the same flat panel display and presence of moire was visually determined according to the following criteria. Table 1 shows the evaluation results.

A: Moire not being visually observed in a displayed image; and

B: Moire being visually observed in a displayed image.

Ball-drop Test

A polycarbonate film having a thickness of 475 μm imitating an optical waveguide sheet was overlaid on a face on one side of a stainless steel plate having a thickness of 5 mm, and thereon, a light diffusion sheet, a first prism sheet, and a second prism sheet were overlaid in this order. It is to be noted that both of the first prism sheet and the second prism sheet were arranged in such a way that apexes of prism arrays protrude to the one side and ridge lines of the prism arrays were perpendicular to each other. Subsequently, each of the sheets Nos. 1 to 8 was attached with an adhesive to a face of a display element of iPhone (registered trademark) 6 opposite to a display surface, such that the coating layer (for the sheet No. 8, the luminance-improving film) was directed outward, and disposed such that the prism array on the second prism sheet faces the coating layer (for the sheet No. 8, the luminance-improving film). Then, a stainless steel spherical body having a diameter of 11 mm was dropped from a height of 150 mm to the display surface side of the display element. Presence of scratches on the second prism sheet resulting from the ball-drop was visually observed and evaluated according to the following criteria. Table 1 shows the evaluation results.

A: No scratches being visually observed;

B: Scratches being visually observed only in a case of direct observation using a reflected light in a dark room, and no scratches being visually observed in a state of being embedded in a liquid crystal display device;

C: Slight scratches being visually observed in a case of direct observation, and no scratches being visually observed in a state of being embedded in a liquid crystal display device;

D: Scratches being visually observed in a case of direct observation, and no scratches being visually observed in a state of being embedded in a liquid crystal display device; and E: Deep scratches being visually observed in a case of direct observation, and scratches being visually observed even in a state of being embedded in a liquid crystal display device.

Face Luminance

Each of the sheets Nos. 1 to 7 was embedded in the same flat panel display, and face luminance at a central part of the flat panel display was measured by using a luminance meter BM-7 available from TOPCON TECHNOHOUSE CORPORATION, with a measurement distance of 500 mm and at a measurement angle of 2°. Table 1 shows the measurement results.

TABLE 1

|  | Average thickness of coating layer (μm) | Coating amount of coating layer (g/m$^2$) | Micro-indentation hardness (N/mm$^2$) | Haze value (%) | Surface resistance value of coating layer (Ω/□) | Moire evaluation | Ball-drop test | Face luminance (cd/m$^2$) |
|---|---|---|---|---|---|---|---|---|
| No. 1 | 7 | 4 | 35.08 | 45 | $10 \times 10^{12}$ | A | A | 430 |
| No. 2 | 8 | 5 | 72.27 | 40 | $10 \times 10^{12}$ | A | A | 433 |
| No. 3 | 8 | 7 | 110.49 | 40 | $10 \times 10^{12}$ | A | B | 434 |
| No. 4 | 6 | 5 | 182.30 | 40 | $10 \times 10^{12}$ | A | D | 433 |

TABLE 1-continued

|  | Average thickness of coating layer (μm) | Coating amount of coating layer (g/m²) | Micro-indentation hardness (N/mm²) | Haze value (%) | Surface resistance value of coating layer (Ω/□) | Moire evaluation | Ball-drop test | Face luminance (cd/m²) |
|---|---|---|---|---|---|---|---|---|
| No. 5 | 7 | 6 | 37.22 | 23 | 10 × 10¹² | A | A | 438 |
| No. 6 | 12 | 10 | 44.18 | 91 | 10 × 10¹² | A | A | 424 |
| No. 7 | 10 | 12 | 282.70 | 45 | 10 × 10¹⁵< | A | E | 432 |
| No. 8 | — | — | 494.80 | — | 10 × 10¹⁵< | B | E | — |

N.B. In Table 1, "—" indicates an absence of measurement.

Evaluation Results

As shown in Table 1, the sheets Nos. 1 to 6 were evaluated to be favorable in terms of moire and exhibited favorable face luminance in the state of being incorporated in a flat panel display. In addition, the sheets Nos. 1 to 6 exhibited microindentation hardness of no greater than 250 N/mm² and were evaluated to be favorable in the ball-drop test. As a result, the sheets Nos. 1 to 6 incorporated in a flat panel display after the ball-drop test were capable of displaying an image as fine as that prior to the ball-drop test.

Furthermore, due to a small surface resistance value of the buffer layer, the sheets Nos. 1 to 6 were capable of sufficiently inhibiting a reduction in buffering properties caused by a foreign substance attached, and lack in uniformity of the luminance caused by a foreign substance attached was not visually observed.

In particular, as shown in relation to the ball-drop test, the sheets Nos. 1 to 3 and 5 were superior in scratch-inhibiting ability for the second prism sheet. As a result, the sheets Nos. 1 to 3 and 5 embedded in a flat panel display after the ball-drop test were capable of displaying a particularly fine image.

To the contrary, the sheets Nos. 7 and 8 had the microindentation hardness of greater than 250 N/mm² and consequently evaluation results in the ball-drop test were poor. Thus, the sheets Nos. 7 and 8 embedded in a flat panel display after the ball-drop test resulted in lack in uniformity of the luminance in a displayed image caused by scratches on the second prism sheet.

INDUSTRIAL APPLICABILITY

As explained in the foregoing, the buffer sheet of the present invention is capable of sufficiently inhibiting a damage to the prism sheet upon an impact applied by falling or the like, and accordingly can be suitably used for a flat panel display having a comparatively small-sized screen such as a smartphone, a tablet terminal or the like.

EXPLANATION OF THE REFERENCE SYMBOLS

1 Edge-lit backlight unit
2 Display panel
3 Casing
3a Support portion
11 Optical waveguide sheet
11a Recessed part
11b Raised part
12 Light source
13 Light diffusion sheet
13a Substrate layer
13b Light diffusion layer
13c Sticking preventive layer
14 First prism sheet
14a Prism
14b Substrate layer
15 Second prism sheet
15a Prism
15b Substrate layer
15c Apex
16 Reflection sheet
17 Display element
18 First polarizing plate
19 Second polarizing plate
20 Polarizer
21 Front face side polarizer protection sheet
22 Buffer sheet
23 Buffer layer
23a Resin matrix
23b Resin beads
24 Substrate layer
25 Projection
32 Buffer sheet
34 Substrate layer
35 Light diffusion layer
35a Light diffusing agent
35b Binder
101 Optical waveguide plate
102 Light source
103 Light diffusion sheet
104 Prism sheet

What is claimed is:

1. A buffer sheet configured for use in a flat panel display comprising a prism sheet having a plurality of prisms on a surface thereof and a display element disposed to face the plurality of prisms, wherein the buffer sheet is configured to be disposed between the prism sheet and the display element, the buffer sheet comprises a buffer layer configured to face the prism sheet, a back face of the buffer layer comprises a planar surface and a plurality of projections protruding scatteredly from the planar surface, an average protrusion height of the plurality of projections is no less than 1.0 μm and no greater than 5.0 μm and an average thickness of the buffer layer is no less than 2 μm and no greater than 20 μm, and an average microindentation hardness of the buffer sheet measured at the plurality of projections is no greater than 250 N/mm².

2. The buffer sheet according to claim 1, wherein the buffer layer comprises a resin matrix and resin beads dispersed in the resin matrix.

3. The buffer sheet according to claim 1, wherein a haze value of the buffer sheet is no less than 20% and no greater than 95%.

4. The buffer sheet according to claim 1, wherein a surface resistivity value of the face on the side to face the prism sheet is no greater than $10 \times 10^{15} \Omega/\square$.

5. The buffer sheet according to claim 1, wherein
the display element is a liquid crystal cell for a liquid crystal display device, and
the buffer sheet is a polarizer protection sheet to be overlaid on a polarizer disposed on a face on an opposite side to a display face of the liquid crystal cell.

6. A flat panel display comprising:
a prism sheet comprising a plurality of prisms on a surface thereof;
a display element disposed to face the plurality of prisms; and
the buffer sheet according to claim 1 disposed between the prism sheet and the display element.

\* \* \* \* \*